United States Patent [19]
Caruso et al.

[11] 3,742,194
[45] June 26, 1973

[54] METHOD AND APPARATUS FOR PROVIDING DIRECT REAL-TIME DETERMINATION OF A PARTICULATE POPULATION

[75] Inventors: Stephen Caruso, Suffern; Henry D. Isenberg, Great Neck; Allen S. Reichler, Pearl River, all of N.Y.; Donald F. Wiseman, Wayne, N.J.

[73] Assignee: Technicon Instruments Corporation, Tarrytown, N.Y.

[22] Filed: May 3, 1971

[21] Appl. No.: 139,432

[52] U.S. Cl. ......... 235/92 PC, 235/92 R, 324/71 CP
[51] Int. Cl. .......................................... G06m 11/02
[58] Field of Search .................... 235/92 EV, 92 PC, 235/92 DM, 92 CP, 92 CC; 324/71 CP

[56] References Cited
UNITED STATES PATENTS

| | | | |
|---|---|---|---|
| 2,991,365 | 7/1961 | Churchill | 235/92 PC |
| 3,219,803 | 11/1965 | Jones | 235/92 CP |
| 3,549,994 | 12/1970 | Rothermel et al. | 235/92 CP |

*Primary Examiner*—Thomas A. Robinson
*Assistant Examiner*—Joseph M. Thesz, Jr.
*Attorney*—Tedesco & Rockwell

[57] ABSTRACT

A method and apparatus is described for determining the susceptibility of a significant microorganism in a biological sample to different anti-microbial agents, and for providing its antibiotic susceptibility profile. Quotients of the biological sample are provided to a plurality of biological chambers, two of such chambers being used as internal "start" and "reference" controls. In the remaining biological chambers, proliferation of the significant microorganism is challenged by the addition of selected antibiotics. In the "start" control chamber the microorganisms are "killed" simultaneously with the addition of antibiotics to the biological chambers; after incubation, the microorganisms in the remaining biological chambers and, also, the "reference" control chambers are "killed" concurrently. Each of the biological chambers and the control chambers are sampled, and the total particulates, i.e., nonviable and "killed" microorganisms and, also, any dust or dirt particles, are counted in particular sequence, ad the respective counts are logically related, so as to signify the susceptibility of the significant microorganism to each of the antibiotics. The results are graphically recorded, so as to provide an antibiotic susceptibility profile of the significant organisms.

17 Claims, 3 Drawing Figures

INVENTORS
STEPHEN CARUSO
HENRY D. ISENBERG
ALLEN S. REICHLER
DONALD F. WISEMAN

BY Tedesco and Rockwell

ATTORNEY

METHOD AND APPARATUS FOR PROVIDING DIRECT REAL-TIME DETERMINATION OF A PARTICULATE POPULATION

BACKGROUND OF THE INVENTION

1. Field of the Invention

The present invention relates to method and apparatus for providing a direct real-time determination of the percent change of a particulate population and, more specifically, for determining the percent change in bacterial growth and for providing antibiotic susceptibility profiles of rapidly growing bacteria. Also, the present invention finds application in the automation of numerous other bacteriological procedures, for example, environmental monitoring, recognition of significant bacteria, identification tests, phage typing of bacteria by viruses, etc.

2. Prior Art

In the prior art, laboratory analyses of biological fluids and tissues and, also, bacteriological assays had been performed routinely by manual techniques. Recently, great advances have been made in the automation of clinical laboratory, as evidenced by the techniques disclosed in U.S. Pat. No. 2,797,149, issued to L. T. Skeggs on June 25, 1957, and in U.S. Pat. No. 3,241,432, issued to L. T. Skeggs et al. on Mar. 22, 1966. However, advances in automation of the clinical or diagnostic microbiological laboratory have not been evidenced. On the contrary, there has been a marked absence of automation, notwithstanding that the manual techniques employed in such laboratories are not particularly reliable and very time consuming and, also, require a high degree of skill and subjective interpretation of the results. For example, wide-spread use is being made of the Bauer-Kirby method of agar diffusion, which requires standardization of each of the many steps including the measurement of zones of inhibition of bacterial growths around antibiotic discs. All steps including assessment of the zones of inhibition, however, require manual measurements, for example, by calipers, and such tests are subject to changes in the ambient, e.g., moisture, temperature, etc. Attempts have been made to automate the measurement of the zones of inhibition, for example, by the optical scanning, but such systems have not been totally reliable.

More recent attempts to automate the bacteriological laboratory have been described in "Capillary-Tube Scanner for Mechanized Microbiology" by R. L. Bowman et al., Science, Vol. 158, October 1967, pp. 78-83. In such latter attempt, the agar, including a particular antibiotic and a significant microorganism, is introduced into a capillary tube and allowed to incubate for predetermined time intervals to produce microcolonies. The capillary tube is periodically scanned by optical techniques, so as to detect an increase in both the size and number of the microcolonies and, hence, the susceptibility of a significant microorganism to a single antibiotic.

However, these prior art systems were not truly automated. A truly automated system is one which provides the same results consistently, and with minimum human intervention. One such system has been disclosed in U.S. patent application Ser. No. 139,435 entitled "Method and Apparatus for Automated Antibiotic Susceptibility Analysis of Bacteria Samples," by H. D. Isenberg et al. filed on even date herewith. In such system, information regarding the antibiotic susceptibility of each microorganism is delivered rapidly, that is, in approximately 3 hours, as compared with routine performance of antibiograms and tube or agar diffusion tests which routinely require approximately 18 to 24 hours. In such system, the antibiotic susceptibility of each of a plurality of growing significant microorganisms is indicated, in turn, by measuring the percentage change in the population of each microorganism with respect to particular antibiotics. Each sample of microorganism is divided into any number of quotients, and introduced into discrete biological chambers, each containing a same volume of broth to support bacterial growth. Such growth is challenged by the addition of different antibiotics to the discrete biological chambers. In addition, two controls are provided which form an intrinsic part of the examination. These controls are identical, i.e. in volume, composition, and microorganism concentration, to the quotients in the biological chambers, and are subjected to a same treatment, i.e., incubation, etc. However, no antibiotic is added to either of such controls during the treatment. The first such control is designated the Y-control, or "start" reference, and the second such control is designated the R-control, or "end" reference. To define the Y-control, the proliferation of microorganisms in one biological chamber is stopped simultaneously with antibiotic delivery to the other biological chambers, for example, by the addition of 10 percent formalin. To define the R-control, microorganisms in a second biological chamber are allowed to proliferate freely. The growth of microorganisms in this second biological chamber and other biological chambers containing a same significant microorganism and different antibiotics are stopped concurrently, e.g. after 150 minutes, by the addition of 10 percent formalin. The difference between the particulate, or cell, populations in the Y-control and R-control biological chambers, respectively, provides a precise measure of the uninhibited proliferation of the microorganisms and, also, a ready reference against which the susceptibilities of the significant microorganism to particular antibiotics can be compared. In addition, since such susceptibilities are measured sequentially, an antibiotic susceptibility profile can be directly provided to the clinician while such information is still of significance to the diagnosis and early treatment of the patient.

OBJECTS OF THE INVENTION

One object of this invention is to provide a system for providing a direct determination of the percentage change in the population of a particulate in suspension.

Another object of this invention is to provide a method and apparatus for determining the activity of a antibiotic agent.

Another object of this invention is to provide a method and apparatus for determining the respective susceptibilities of a microorganism to various antibiotics and to provide its antibiotic susceptibility profile rapidly and in correlated fashion to the clinician.

Another object of this invention is to provide a method and apparatus for positively measuring and monitoring increases in the population of biological particulates in suspension.

Another object of this invention is to provide method and apparatus for determining growth-no growth phenomenon.

SUMMARY OF THE INVENTION

These and other objects and features of this invention are achieved by successively sampling and optically counting the total particulate population, including nonviable or "killed" microorganisms, and any stray dust or dirt particles, the quotients in each of the biological chambers, including the Y-control chamber and the R-control chamber, containing quotients of a same sample. Appropriate logic is provided to substract the Y-count from the R-count, so as to indicate the increased population of viable microorganisms in the sample during a standard incubation period, i.e., the actual proliferation in the absence of any antibiotic or other inhibitive agent. The (R-Y)-count reflects the uninhibited growth of the microorganisms, and provides a ready and accurate reference, or standard, peculiar to each sample for determining the response of the significant microorganism to particular antibiotics or any other agent or condition introduced into the other biological chambers. The total particulate population, i.e., nonviable and "killed" microorganisms and stray dust and dirt particles, in each of the remaining biological chambers are counted. The Y-count is subtracted from each such count, hereinafter designated S-count, so as to provide a precise indication of the increased population of the significant microorganism in the presence of the particular antibiotic introduced into the corresponding biological chamber. Appropriate logic is provided to compare the (S-Y)-count corresponding to each biological chamber containing an antibiotic or other agent against the corresponding (R-Y)-count indicating the actual uninhibited proliferation of the significant microorganisms, so as to determine the susceptibility of the significant microorganism to each of the antibiotics, in turn.

As hereinafter described, appropriate logic is provided for storing the Y-count and the R-count corresponding to each sample, so as to be available for the successive processing, in turn, of each of the quotients, or samplings, derived from a same sample. Since the quotients of a same sample are processed, or counted, in turn, the susceptibility of the significant microorganism to different antibiotics can be recorded sequentially and in correlated fashion, so as to provide a complete antibiotic susceptibility profile almost immediately to assist in the diagnosis and early treatment of the patient.

DESCRIPTION OF THE DRAWINGS

These and other objects and features of the invention will be made clear by the following related description in conjunction with the accompanying drawings, wherein.

DESCRIPTION OF THE PREFERRED EMBODIMENT

Figure 1A:
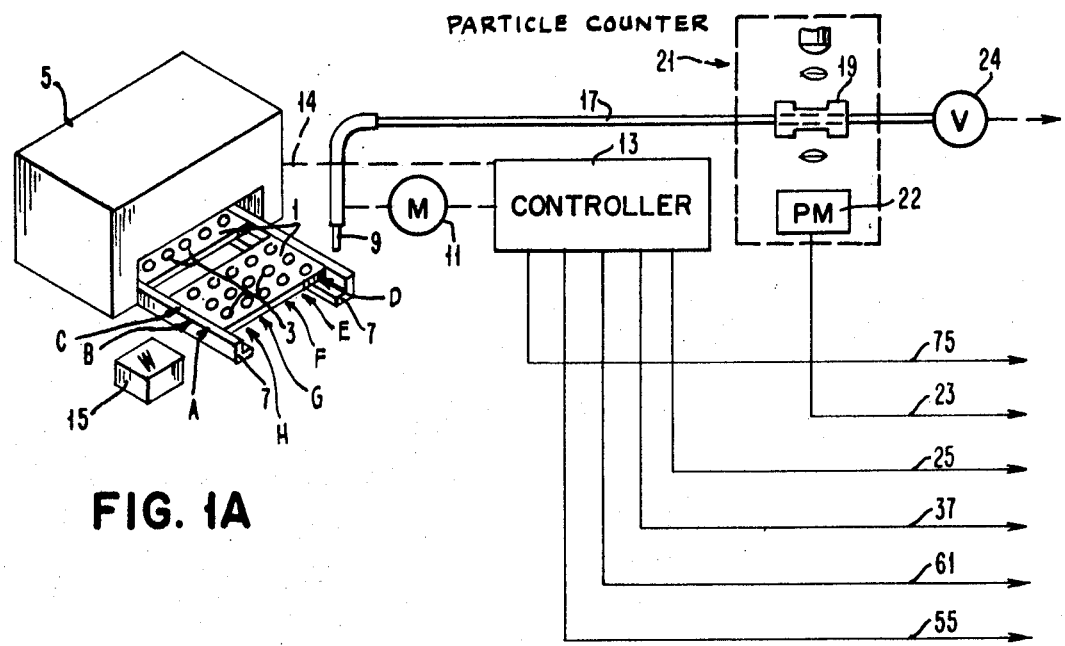
FIGS. 1A and 1B is a schematic illustration of a system for practicing the invention, such system including appropriate logical circuit arrangements for ascertaining the susceptibility of a significant microorganism to any number of antibiotics.

Referring initially to FIG. 1A, the system comprises a plurality of sample trays 1, each having a plurality of rows A, B, and C of biological chambers 3, each row corresponding to a particular sample having a significant microorganism. Each tray 1 has been previously processed by apparatus, not shown in detail. The apparatus included in cabinet 5 corresponds substantially to that described in the above-identified Isenberg et al. patent application. As described, chambers 3 in each row A, B, and C of tray 1 contains a quotient from a same bacterial sample. Chambers 3 along columns D and E are employed to provide intrinsic controls, i.e., the Y-control and the R-control, respectively, as hereinafter described. Also, each chamber 3 along a same row have been provided a same precise volume, or quotient, of a same sample and a same volume of broth to support cell proliferation. Each tray 1 is acted upon in apparatus 5, such that the Y-control chambers 3 along column D are killed concurrently with the addition of selected antibiotics into corresponding chambers 3 along columns F, G, and H, respectively, so as to define the corresponding Y-control; no antibiotic or inhibitive agent is added to the corresponding chamber 3 of column E, so as to allow uninhibited growth of the significant microorganism and to define the corresponding R-control.

Accordingly, the cultures in corresponding chambers 3 in columns E, F, G, and H of a same row, are incubated for a same time interval prior to "killing." After suitable incubation, formalin is added concurrently to corresponding chambers 3 connect to row A, columns E, F, G and H, so as to stop further cell proliferation. The cell proliferation in corresponding chambers 3 in rows F, G and H, respectively, is dependent upon the susceptibility of the significant microorganism to the particular antibiotics introduced into such chambers, as described in the above-identified Isenberg et al. patent application, whereas cell proliferation in chamber 3 along column E is totally uninhibited. The apparatus within cabinet 5 operates to advance trays 1, in turn, along guides 7, so as to position each row of chambers 3 at an "off-take" position beneath aspirating probe 9.

Probe 9 is moved by drive motor 11 under the control of controller 13. Controller 13 operates in phase with apparatus within cabinet 5, as indicated by line 14, to control drive motor 11, such that probe 9 is immersed into and withdrawn from chambers 3 in each row and a wash reservoir 15, successively in turn. A quotient from each chamber 3 is withdrawn and aspirated along probe 9, and passed along conduit 17 through the flow cell 19 of particle counter 21 by a suction developed by vacuum pump 24. The particle counter can be conventionally designed and, for example, may be of the type described in U.S. Pat. No. 3,511,573, issued to J. Isreeli on May 12, 1970. The quotients of a same biological sample passed along conduit 17 are separated from the immediately adjacent quotients by an air segment aspirated while probe 9 is being advanced between successive chambers 3. Also, quotients from a particular sample and aspirated from chambers 3 of a same row of tray 1 are separated on a group basis by a wash-liquid segment aspirated during immersion of probe 9 into reservoir 15. Subsequently, probe 9 is rapidly returned by drive motor 11, so as to be positioned, as shown, to await the advance of tray 1, or a subsequent tray 1 shown within cabinet 5, along guides 7 to position a next row of chambers 3 at the off-take position. When such next row is positioned, drive motor 11 repeats the same sequence of operation, whereby a continuous stream of quotients of different biological samples are passed along conduit 17.

Figure 2:
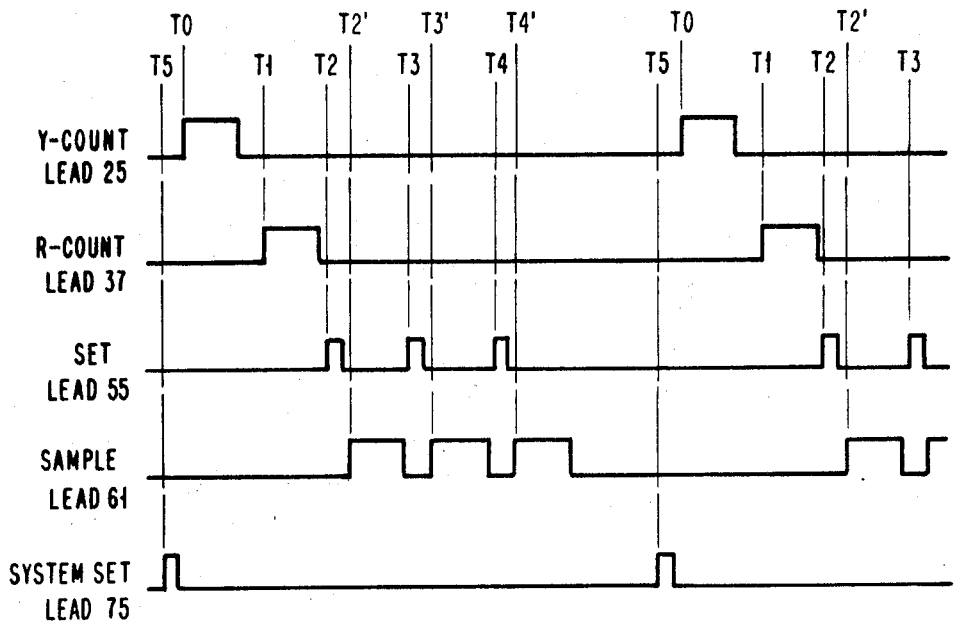
FIG. 2 is a time diagram to facilitate an understanding of the operation of FIG. 1.

Accordingly, quotients from chambers 3 in each of the rows A, B, and C of successive trays 1 are directed sequentially through flow cell 19 of counter 21, the running time for each such quotient to the flow cell being the same. The passage of each particulate, e.g., whether an unviable or "killed" microorganism, a dust or dirt particle, etc., are counted indiscriminately by counter 21. The passage of each particulate along flow cell 19 is detected by photomultiplier 22, which directs a count pulse along count lead 23 to one input of each of AND gates A1, A2 and A3, shown in FIG. 1B. At time T0, when the quotient aspirated from the Y-count chamber 3 common to row A and column D of tray 1 is passing through flow cell 19, controller 13 energizes Y-count line 25, as illustrated in FIG. 2. Accordingly, gate A1 is enabled and count pulses directed along count lead 25 are passed along lead 27 to the count-up terminal 29 of Y-counter 31. Y-counter 31 may comprise a conventional "up-down" counter, having a 12-bit capacity and having preset, or loading, and clear capabilities. A suitable counter arrangement is presently being marketed by Texas Instruments Inc., and identified as "SN74193" SYNCHRONOUS COUNTERS. While Y-count line remains energized, all particulates in the quotient flowing through flow cell 19 are counted. At time T0, Y-memory 33 was enabled along lead 35 connected to the Y-count line 25, so as to continuously track and store the count being accumulated in Y-counter 31. Y-memory 33 may comprise a conventional bi-stable latching arrangement having a 12-bit capacity and having up-dating and non-destructive readout capbilities. A suitable arrangement is presently being marketed by Texas Instruments Inc., and identified as "SN7475" BI-STABLE LATCHES. After a predetermined time interval, e.g., 4 seconds, controller 13 disables the Y-count line 25, so as to disable both Y-counter 31 and Y-memory 33 and, also, to disable AND gate A1. The final count stored in Y-memory 33 serves as the Y-control, indicating the total number of particulates, both nonviable and "killed" microorganisms and any dust or dust particles, present in the original biological sample.

At time T1, as the portion of the quotient aspirated from R-count chamber 3 common to column E and row A, i.e., for defining the R-count, is passing through flow cell, controller 13 energizes R-count lead 37, as shown in FIG. 2, so as to enable AND gate A2. R-count lead 37, is also connected to the enable input terminal 39 of the R-memory 41, to one input of OR gate A11, and to one input of AND gate A7. Accordingly, R-memory 39 will track and store the count now to be accumulated in the R-counter 43. Preferably, R-counter 43 and R-memory each have a 16-bit capacity, and may be of similar construction as Y-counter 31 and Y-memory 33, respectively. The output of AND gate A2 is connected to one input of each of the AND gates A4 and A5; the remaining inputs of AND gates A4 and A5 are connected to the reset and set terminals, respectively, of flip-flop F/F1, which is in a set position, as hereinafter described. Energization of R-count lead 37 enables OR gate A11 to operate "one-shot" multi-vibrator 45, whose output is connected to the load terminal 47 of Y-counter 31, which is then preset to the count stored in Y-memory 33, i.e., the Y-control. Since AND gates A2 and A5 are enabled, the count pulses directed along count lead 23 are passed through OR gate A6 to the count-down terminal 49 of Y-counter 31. When Y-counter 31 passes through zero, a pulse is directed along the borrow line 51 to one input of AND gate A7, which is enabled, so as to reset flip-flop F/F1. Resetting of flip-flop F/F1 disables AND gate A5 and enables AND gate A4, whereby the count pulses passed along count lead 23 and through AND gate A2 are steered through enabled AND gate A4 to the count-up terminal 53 of R-counter 43. The count pulses directed to count-up terminal 53 are accumulated in R-counter 43 and simultaneously registered in the R-memory 41. Accordingly, the number registered in R-memory 41 indicates the increase, or uninhibited proliferation, of viable microorganisms in the biological sample, and defines the R-control.

Figure 1B:
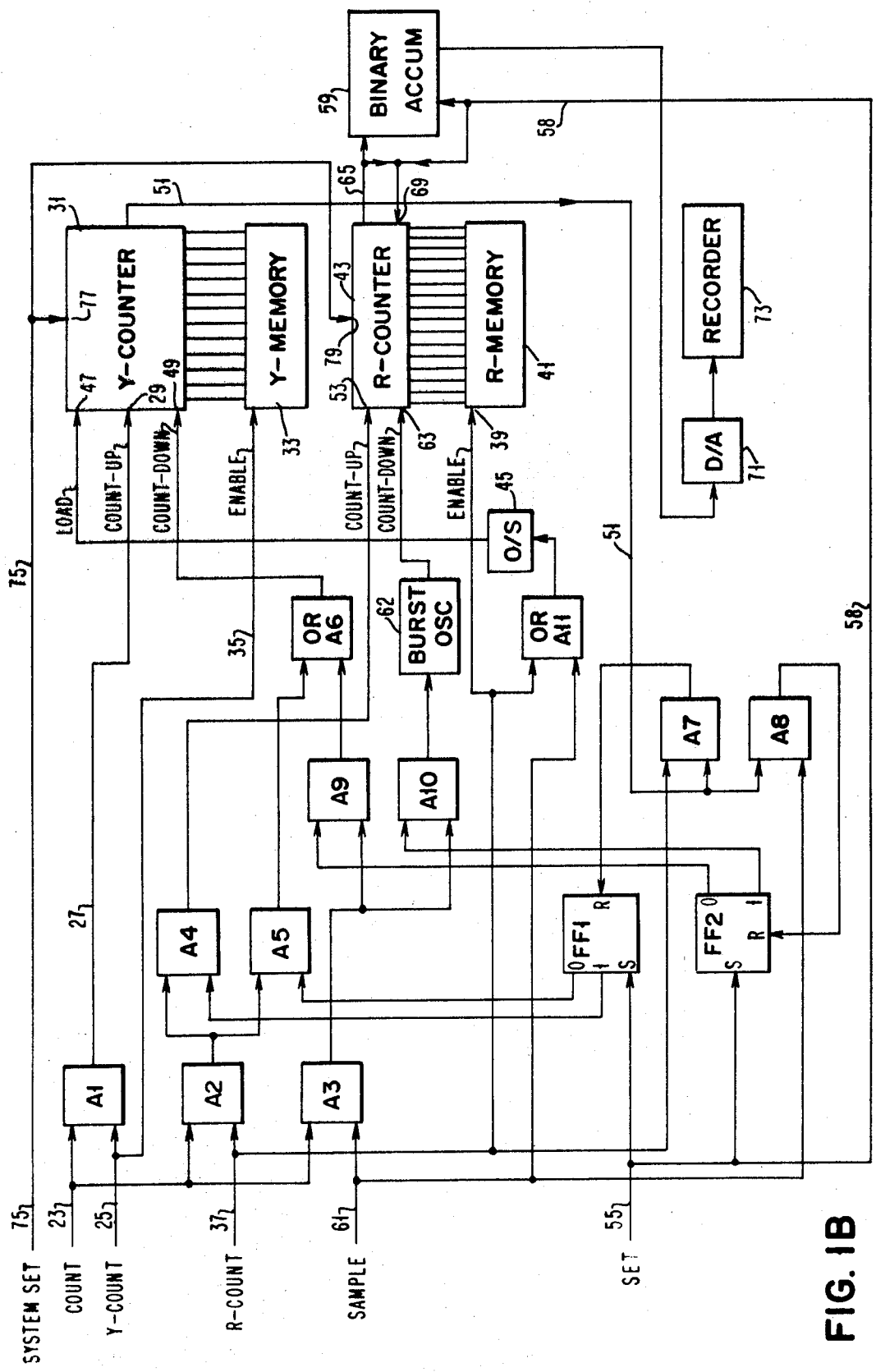

After a 4-second time interval, controller 13 disables R-count lead 37, as illustrated in FIG. 2. The next operation is to count the particulates in each of the remaining chambers 3 in the same row so as to determine the susceptibility of the significant microorganism with respect to the particular antibiotics corresponding to columns D, E and F. For example, at time T2 as illustrated in FIG. 2, set lead 55 is energized by controller 13, so as to set flip-flops F/F1 and F/F2 along leads 56 and 57, respectively, and to reset binary accumulator 59 along lead 58. The set and reset terminals of flip-flop F/F2 are connected to one input of AND gates A9 and A10, respectively; the remaining inputs of AND gates A9 and A10, are connected to the output of AND gate A3. At time T2', and while the quotient from chamber 3 along column F is passing through flow cell 19, controller 13 enables sample line 61. As illustrated in FIG. 1B, sample line 61 is connected to one input of AND gate A8. When sample line 61 is energized, OR gate A11 passes signal to operate one-shot multi-vibrator 45, so as to preset Y-counter 31, i.e., to the Y-control. Concurrently, AND gates A3 and A9 are enabled, such that count pulses directed along count lead 23 are passed through OR gate A6 to the count-down terminal 49 of Y-counter 31. Each count pulse, therefore, reduces the count in Y-counter 31, the Y-control registered in Y-memory 33 being uneffected as lead 35 is unenergized. When Y-counter 31 goes through zero, a pulse is directed along borrow lead 51 and through enabled AND gate A8 to reset flip-flop F/F2, whereby AND gate A9 is disabled and AND gate A10 is enabled. Each subsequent count pulse passed along count lead 23 passes through enabled AND gates A3 and A10 to the input of burst oscillator 62. Burst oscillator 62 operates to multiply input pulses by a factor of, for example, 100. It is evident that the total count pulses directed to input of burst oscillator 62 are in excess of the Y-control, and indicate the proliferation of viable microorganisms in the presence of a particular antibiotic.

The output of burst oscillator 62 is connected to the count-down terminal 63 of R-counter 43. Each pulse directed from burst oscillator 62 decreases the count in R-counter 43. Each time R-counter 43 passes through zero, a borrow pulse is directed along lead 65 to binary accumulator 59 and, also, along lead 67 to load terminal 69. Accordingly, when R-counter 43 is counted to zero, it is immediately preset to the R-control registered in R-memory 41, and its count continues to be depleted. It is evident that, during each energization of sample lead 61, the number of borrow pulses directed along lead 65 to binary accumulator 59 equals 100(S-

Y)/(R-Y) and, therefore, the percentile of (S-Y)/(R-Y), where R and Y are the R-count and Y-count, respectively, and S is the particulate count in a quotient of the same sample.

After a same time interval, i.e., 4 seconds, sample line 61 is de-energized by controller 13, whereby AND gate A3 is disabled. At time T3, as illustrated in FIG. 2, set lead 55 is energized to reset the binary accumulator 59 along lead 58 to direct its count to D/A converter 71. The output of D/A converter 71 is connected to recorder 73, wherein the results are recorded. Additionally, energization of set lead 55 operates to set flip-flop F/F 2, as hereinabove described, so as to condition the system for the counting of a next subsequent quotient passing through flow cell 19.

At time T3', and while the quotient from chamber 3 common to row A and column G is passing through flow cell 19, sample line 61 is again energized by controller 13, so as to fire one-shot multi-vibrator 45 through OR gate A11, so as to preset Y-counter 31 to the Y-control registered in Y-memory 33, and to enable AND gate A3, so as to allow passage of count pulses passed along count lead 23 through AND gate A9 and OR gate A6 to the count-down terminal 49 of Y-counter 31. As above described, when the count of Y-counter 31 reduces to zero, a borrow pulse is directed along lead 51 to enabled AND gate A8 so as to reset flip-flop F/F2. Accordingly, subsequent count pulses directed along count lead 23 pass through AND gates A3 and A10 and to the input of burst generator 62. R-counter 43 has been preset at time T3 by pulse passed along set lead 55 and lead 58 to the load terminal 69. Accordingly, the percentile of (S-Y)/(R-Y) for the quotient sampled from chamber 3 common to row A in row G is provided to binary accumulator 59 and subsequently recorded, in turn, by recorder 73.

When the counting of the quotient portion from chamber 3 in column G is completed, i.e., after 4 seconds, controller 13 disables sample line 61, and energizes set lead 55, as illustrated in FIG. 2, to set flip-flop F/F2, to preset R-counter 43 along lead 58, and to set the binary accumulator 59 along lead 58. Accordingly, the logic is conditioned to prepare for a next counting operation with respect to the quotient sampled from chamber 3 in column H. At time T4', as illustrated in FIG. 2, and while the quotient from chamber 3 common to row A and column H is passing through flow cell 19, sample line 61 is enabled by controller 13, and a same operation is provided so as to provide the percentile of (S-Y)/(R-Y) to binary accumulator 59 for recording by recorder 73.

When chambers 3 in each row of tray 1 have been sampled and the respective quotients passed along probe 9, controller 13 operates motor 11 to immerse probe into reservoir 15. While the wash liquid, segmented by air segments from groups of different quotients, corresponding to excessive biological samples, is passed through flow cell 19, controller 13 energizes patient set lead 75 at time T5. Patient set lead 75 is connected to reset terminals 77 and 79 of Y-counter 33 and R-counter 41, respectively, whereby each such counter is set to zero. The systems now conditioned to determine the antibiotic susceptibility of the significant microorganism in the biological sample provided in the next adjacent row of chambers 3 being advanced to the "off-take" position beneath probe 9. When Y-count line is next energized at line T0, the Y-counter 31 develops the Y-control and, subsequently, the R-counter 43 develops the R-control when R-count lead 37 is energized at time T1, as has been described. The Y-control and R-control are peculiar to the biological sample in the next row of chambers 3, and are subsequently utilized to determine the susceptibility of the significant microorganism contained therein to the particular antibiotics corresponding to columns F, G, and H of trays 1. These susceptibilities are determined in the manner hereinabove set forth, and the results recorded in sequentially and correlated fashion by recorder 75, so as to provide a profile. If recorder 73 is a stylus recorder, such profile is presented as a correlated group of peaks, the amplitude of each peak corresponding to the susceptibility of the significant microorganism in the biological sample with respect to the corresponding antibiotic, and each group of peaks corresponding to the significant microorganism in a single biological sample. Alternatively, the output of binary accumulator 59 could be directed to a digital/decimal converter, not shown, whereby the recorder would be operative to print out the percentile number indicative of the susceptibility of the significant microorganism with respect to the corresponding antibiotic.

What is claimed is:

1. Apparatus for determining a change in the population of a given particulate in a sample, the population of said particulate being variable and increasing with time, comprising first, second and third chamber means containing first, second and third quotients of a same sample, means for introducing a first inhibiting agent into said first quotient to inhibit a normal change in the population of said particulate in said first quotient and, concurrently, a second inhibiting agent into said second quotient to inhibit any change in the population of said particulate in said second quotient, said particulate in said third quotient being allowed to vary in normal manner, means for detecting and counting the number of particulates in said first quotient, said second quotient and said third quotient, so as to obtain a first count, a second count, and a third count, respectively, said detecting and counting means being operative to count the increased population of said particulates in said first and third quotients, respectively, after a same time interval, logic means for substracting said second count from said third count to obtain a first difference count indicative from the normal change of population of said particulate and for substracting said second count from said first count to obtain a second difference count indicative of the inhibited change in population of said particulate, and means for relating said first and second counts to ascertain the response of said particulate to said first inhibiting agent.

2. Apparatus as in claim 1 further comprising means responsive to said relating means for recording an indication of the response of said particulate to said first inhibiting agent.

3. Apparatus as defined in claim 1, further including additional chamber means containing additional quotients of said sample, means for introducing different inhibiting agents into said additional quotients, so as to inhibit normal changes in the population of said particulate therein in accordance with the response of said particulate to said different inhibiting agents, said detecting and counting means being operative to count the particulates in each of said additional quotients after said same time interval, so as to obtain individual sample counts, said logic means being operative to substract said second count from each of said individual sample counts, so as to obtain individual sample difference counts, said relating means being operative to relate each of said sample difference counts to said first difference count, so as to determine the response of said given particulate to said different inhibiting agents.

4. Apparatus according to claim 3, further including means for recording the response of said particulate to said first inhibiting agent and said different inhibiting agents in correlated fashion.

5. Apparatus according to claim 4 wherein said relating means are operative to determine the response of said particulate to said first inhibiting agent and said different inhibiting agents sequentially, and means for recording an indication of each such response sequentially and in correlated fashion.

6. Apparatus according to claim 3 wherein said logic means includes a count-down counter, means for presetting said count-down counter to said first difference count, and means for directing said second difference count and said sample difference counts to said count-down counter, and recorder means responsive to said count-down counter.

7. Apparatus according to claim 6, wherein said directing means is operative to direct said second difference count and said sample difference counts to said count-down counter, in turn.

8. Apparatus according to claim 7, wherein said directing means includes for multiplying said second difference count and said sample difference counts by a given factor, each of said counts being operative to reduce the count in said count-down counter to zero, so as to preset said count-down counter to said first difference count and provide an output pulse, means for accumulating each said output pulse from said count-down counter.

9. Apparatus according to claim 3, wherein said logic means includes a first counter having an associated first memory and a second counter having an associated second memory, said detecting and counting means being operative to direct a pulse to said logic means upon detection of a particulate, said logic means being operative to direct pulses indicative of said second count to said first counter means for storage in said first memory, said logic means being operative to direct pulses indicative of said second difference count to said second counter.

10. Apparatus according to claim 9, wherein said first counter is an up-down counter, means for presetting said first counter to said second count, said logic means being operative to direct pulses indicative of said third count to said first counter, said logic means being operative upon the count of said first counter being depleted to zero to direct any remaining pulses of said third count to said second counter for storage in said memory means as said first difference count.

11. Apparatus according to claim 10, wherein said second counter is a up-down counter, means to preset said second counter to said first difference count, said logic means being operative to direct pulses indicative of said first count to said first counter so as to deplete the count therein, said logic means being operative upon the count of said first counter being depleted to zero to direct any remaining pulses indicative of said first count to said second counter so as to deplete the count therein.

12. Apparatus according to claim 11, wherein said logic means includes means for multiplying said remaining pulses indicative of said first count by a given factor, whereby said count in said second counter is depleted to zero, said logic means being operative upon the count of said second counter being depleted to zero to provide an output pulse and preset said second counter to said first difference count, and means for accumulating said output pulses from said second counter.

13. Apparatus according to claim 3, further including means for passing at least a portion of each of said first, second and third quotients as a continuous stream along a conduit, and said detecting and counting means being operative to count particulates in said quotient portions passing along said conduit.

14. Apparatus according to claim 13, further including gating means connecting said detecting and counting means and said logic means, said gating means being operative for a same time interval with respect to each of said quotient portions passing along said conduit.

15. Apparatus according to claim 14, wherein said detecting and counting means and said logic means are operative and in fixed sequence with respect to the quotients of said sample and said additional sample, whereby said respective responses of said particulates in said sample and said additional sample, respectively, are recorded in correlated fashion.

16. Apparatus according to claim 3, further including further chamber means containing first, second third and additional quotients of an additional sample having another given particulate whose population is variable, said detecting and counting means, said introducing means, and said logic means being operative upon said first, second and third quotients and said addition quotients of said additional sample, so as to determine the response of said another given particulate to said first inhibiting agent and said additional inhibiting agents, and means for recording the respective responses of said particulate and said another particulate in said sample and said additional sample, respectively, to said first inhibiting agent and said additional inhibiting agents in correlated fashion.

17. Apparatus according to claim 16, further including means for conditioning said detecting and counting means and said logic means prior to process said sample and said additional sample.

* * * * *